Dec. 9, 1947.        A. M. STONER        2,432,350
SELF CENTERING CHUCK
Filed April 3, 1944

INVENTOR
Arthur Merrick Stoner
BY
E. W. Marshall
ATTORNEY

Patented Dec. 9, 1947

2,432,350

UNITED STATES PATENT OFFICE 2,432,350

SELF-CENTERING CHUCK

Arthur Merrick Stoner, West Hartford, Conn., assignor to The Jacobs Manufacturing Company, Hartford, Conn., a corporation of Connecticut Application April 3, 1944, Serial No. 529,335

7 Claims. (Cl. 279—16)

This invention relates to a self-centering chuck and its object is to provide a chuck which is capable, with a preliminary engagement with a cylindrical article, of imparting rotation to the article without rigidly holding the article against lateral movement. The tool engaging edges or faces of the clamping members of chucks as heretofore made are apt to be somewhat out of alinement with the axis of rotation of the chuck and a drill or tool held in it will not run true, or if the pointed end of the drill rotates about a fixed axis not in alinement with the axis of the chuck, the chuck will wabble. According to the present invention the clamping members are formed with convex longitudinally disposed gripping edges on which the engaged article may rock to a limited extent and thus be moved laterally in relation to the chuck. Such lateral movement may be further limited or restrained by increasing the grip of the holding members on the engaged article or tool.

For convenience I will show and describe a chuck of a well known type modified according to the present invention. In such chucks the inner edges of the gripping members usually are parallel to the axis of the chuck and lie in a common cylindrical surface. If this cylindrical surface is not exactly concentric with the axis of rotation of the chuck, any cylindrical article engaged and held by the gripping members will run out of line with the axis of rotation imparted to it by the chuck. I have found a way of correcting such error which I will now describe.

In the drawings:

Fig. 7 is a plan view of the central gripping member 41 shown in Fig. 5;

Fig. 8 is a central longitudinal section of a part of the member shown in Fig. 7, the section being taken on the line 8—8 of the latter figure.

Fig. 9 is a transverse section of the part of the gripping member shown in Fig. 8; the section of this figure is taken on the line 9—9 of Fig. 8;

Fig. 10 is a rear end elevation of the gripping member.

Figure 1:
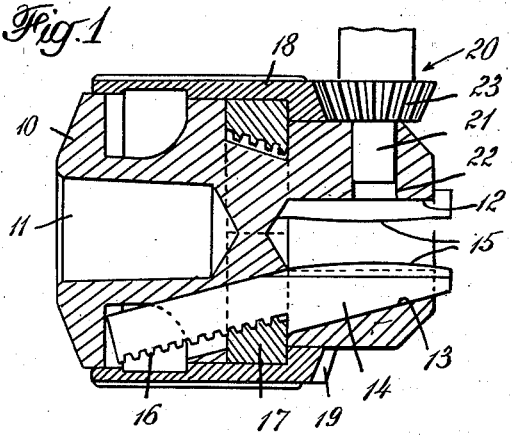
Figure 1 is a sectional side elevation of a standard chuck which is modified to embody my invention. The section is taken on the line 1—1 of Fig. 2.
Figure 2:
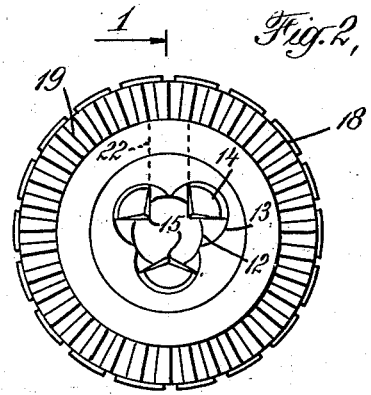
Fig. 2 is a front elevation of the chuck shown in Fig. 1.
Figure 10:
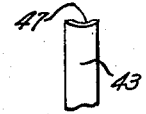
Figs. 7–10 show one of the gripping members. Of these figures.

In Figs. 1 and 2 10 designates the body of the chuck. Its rear end is constructed to fit a driven part of the machine tool such as the spindle of a drill press or a lathe. In the specific form shown it is provided with a tapered opening 11 for this purpose. 12 is an axially central bore in the body from its forward end. 13 designates three equally spaced semi-cylindrical channels formed in the body on diagonal axes which converge toward a common point in front of the body on the axis of its bore 12. Gripping members 14 are longitudinally slidable in these channels. These members have gripping edges 15 which are in radial planes through the axis of the chuck. According to former practice these gripping edges were straight but according to this invention they are convexly curved on equal radii extending from points in a plane normal to the axis of the chuck and passing through the approximate longitudinal center of the gripping edges. The backs of the shanks of these members are transversely threaded as at 16 and are engaged by an arcuately split nut 17 tightly inserted in a sleeve 18 which is rotatively supported on the body 10. Beveled gear teeth 19 are formed on the front face of this sleeve.

20 is a wrench for rotating the sleeve 18 and the nut 17 to slide the gripping members 14 in their channels 13. The wrench has a cylindrical boss 21 which is adapted to fit into a radial opening 22 formed in the body. Several of these openings may be provided, preferably spaced between the channels 13. The wrench has a bevel gear 23 with teeth which fit the teeth 19 on the sleeve 18.

Figure 3:
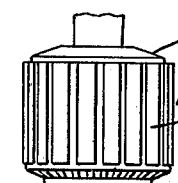
Fig. 3 is a side elevation of a chuck like that shown in the preceding figures, with a drill in it, together with a jig bushing shown in section, in axial alinement with the chuck. The drill is shown out of alinement with the chuck and the bushing to a somewhat exaggerated degree.

Rotation of the sleeve 18 and the nut 17 in one direction will move the members 14 toward the forward end of the chuck and their gripping faces inwardly. Their curved gripping edges will make line contacts with an article inserted between them if the article is cylindrical and the pressure may be increased sufficiently to rotate the article. If the article is a drill 30 and as thus engaged by the gripping members, is out of alinement with the axis of the chuck, as shown in Fig. 3, it may be moved laterally in the direction indicated by the arrow A in the latter figure into alinement with the axis of the drill and of a jig bushing 31 which is in axial alinement with the chuck. During such lateral centering movement the part of the drill shank which is engaged by the curved inner edges of the gripping members will rock on the latter. The centering described is usually effected automatically by lowering the chuck and the drill into the bushing 31 while the drill is rotating. The upper end 32 of the bushing is flared to receive and guide the drill. After the drill has been centered the gripping members may be further tightened onto it.

Figure 4:
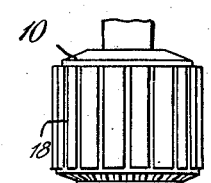
Fig. 4 is a similar view of a chuck and drill, with the point of the drill in a center-punch indentation in a piece of sheet metal to be drilled, with the indentation out of alinement with the axis of the chuck.
Figure 7:
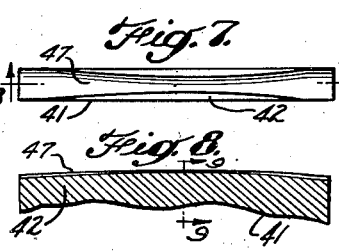
Figure 8:
Figure 9:
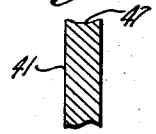

If the chuck is out of axial alinement with a center punch indentation 33, in a piece of material 34 to be drilled with which indentation the end of the drill is engaged, as shown in Fig. 4, the chuck may be moved laterally in the direction indicated by the arrow B in this figure to effect the desired alinement of the parts before the final tightening of the gripping members. These conditions may exist in a case where the chuck is a part of a hand supported tool.

Figure 5:
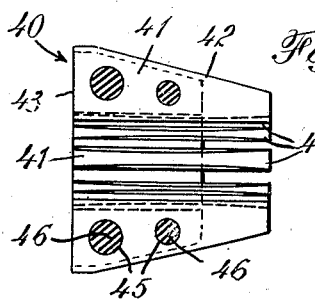
Fig. 5 is a sectional side elevation of a collet of the type shown in my Patent No. 2,346,706 issued April 18, 1944, modified according to the present invention.
Figure 6:
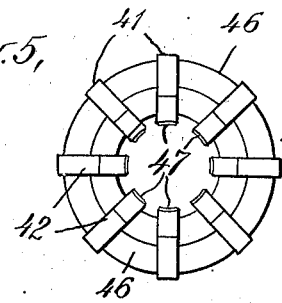
Fig. 6 is a front elevation of the collet shown in Fig. 5.

The collet 40 shown in Figs. 5 and 6 comprises a plurality of flat sided gripping members 41 of rigid material such as hardened steel equally spaced around a common axis in longitudinal parallelism and positioned approximately radially in relation to this axis. Their outer edges 42 are inclined to the axis and lie in a common conical surface. The larger ends 43 of the gripping members are at right angles to the axis and lie in a common transverse plane. 45 designates spaced perforations through the members 41.

The spaces between the gripping members are filled with resilient material 46, such as oil resistant synthetic rubber, which passes through the perforations 45. This effectively holds the gripping members in desired longitudinally and angularly spaced relations, but because of its resiliency permits them to be moved relatively.

According to the present invention, the surfaces 47 between the inner edges of the gripping members are convexly curved on equal radii extending from points in a plane normal to the axis of the collet and passing through the approximate longitudinal center of the collet. They are also transversely curved concavely.

When a collet of this type is used, its gripping members 41 will be moved inwardly and their curved surfaces 47 will make line contacts with a cylindrical article inserted between them. The operation is similar to that previously described.

Various modifications in construction, mode of operation, method and use of an invention may and do occur to others, especially after benefitting from knowledge of such disclosure as that herein presented of the principles involved, but the invention itself is not confined to the present showing.

I claim:

1. A rotatable chuck, a plurality of angularly spaced gripping members therein each having edges substantially parallel to the axis of rotation and a gripping portion intermediate and substantially parallel to said edges convexly curved longitudinally to permit a swinging lateral movement of a cylindrical article engaged by said clamping portions.

2. A rotatable chuck, a plurality of angularly spaced gripping members therein each having edges substantially parallel to the axis of rotation and a gripping portion intermediate its edges convexly curved symmetrically from the center of said portion to the ends thereof arranged to permit a swinging lateral movement of a cylindrical article engaged by said clamping portions.

3. A chuck comprising a rotatable body, angularly spaced guides in the body inclined to the axis of rotation and gripping members supported in said guides and longitudinally slidable therein, each of said members having edges substantially parallel to the axis of rotation and a gripping portion intermediate and substantially parallel to said edges convexly curved longitudinally to permit a swinging lateral movement of a cylindrical article engaged by said clamping portions.

4. A collet comprising a plurality of angularly spaced gripping members radially disposed about an axis and parallel to said axis, the inner surfaces of said members being longitudinally curved convexly to permit a swinging lateral movement of a cylindrical article engaged by said curved surfaces.

5. A collet comprising a plurality of angularly spaced gripping members radially disposed about an axis and parallel to said axis, the inner surfaces of said members being transversely curved concavely and longitudinally curved convexly to permit a swinging lateral movement of a cylindrical article engaged by said curved surfaces.

6. A collet comprising a plurality of angularly spaced gripping members radially disposed about an axis and parallel to said axis, the inner surfaces of said members being longitudinally curved convexly symmetrically from end to end to permit a swinging lateral movement of a cylindrical article engaged by said curved surface.

7. A collet comprising a plurality of angularly spaced gripping members radially disposed about an axis and parallel to said axis, the inner surfaces of said members being transversely curved concavely and longitudinally curved convexly and symmetrically from end to end to permit a swinging lateral movement of a cylindrical article engaged by said curved surfaces.

ARTHUR MERRICK STONER.

REFERENCES CITED

The following references are of record in the file of this patent:

UNITED STATES PATENTS

| Number | Name | Date |
|---|---|---|
| 100,458 | Shephardson | Mar. 1, 1870 |
| 2,346,706 | Stoner | Apr. 18, 1944 |
| 1,044,299 | Trundle | Nov. 12, 1912 |
| 1,123,541 | Jacobs | Jan. 5, 1915 |
| 1,178,283 | Winter | Apr. 4, 1916 |